United States Patent
Mathew Abraham et al.

(10) Patent No.: US 11,966,330 B2
(45) Date of Patent: Apr. 23, 2024

(54) LINK AFFINITIZATION TO REDUCE TRANSFER LATENCY

(71) Applicant: Intel Corporation, Santa Clara, CA (US)

(72) Inventors: Vinit Mathew Abraham, Hillsboro, OR (US); Jeffrey D. Chamberlain, Tracy, CA (US); Yen-Cheng Liu, Portland, OR (US); Eswaramoorthi Nallusamy, Cedar Park, TX (US); Soumya S. Eachempati, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 16/894,402

(22) Filed: Jun. 5, 2020

(65) Prior Publication Data

US 2020/0301830 A1    Sep. 24, 2020

(51) Int. Cl.
| | |
|---|---|
| *G06F 13/16* | (2006.01) |
| *G06F 12/08* | (2016.01) |
| *G06F 12/0802* | (2016.01) |
| *G06F 13/40* | (2006.01) |

(52) U.S. Cl.
CPC ...... *G06F 12/0802* (2013.01); *G06F 13/1668* (2013.01); *G06F 13/4027* (2013.01); *G06F 2213/16* (2013.01); *G06F 2213/40* (2013.01)

(58) Field of Classification Search
CPC ............ G06F 12/0802; G06F 13/1668; G06F 13/4027; G06F 2213/16; G06F 2213/40
USPC ........................................................ 711/141
See application file for complete search history.

(56) References Cited

U.S. PATENT DOCUMENTS

| | | | |
|---|---|---|---|
| 7,315,919 B1* | 1/2008 | O'Krafka ............ | G06F 12/0817 711/146 |
| 9,606,925 B2 | 3/2017 | Fahim et al. | |
| 10,339,060 B2 | 7/2019 | Fahim et al. | |
| 10,402,327 B2 | 9/2019 | Roberts et al. | |
| 10,534,687 B2 | 1/2020 | Fahim et al. | |
| 11,016,913 B1* | 5/2021 | Kaushikkar ......... | G06F 12/0804 |
| 2011/0099334 A1* | 4/2011 | Kwon .................. | G06F 1/3237 711/141 |

(Continued)

OTHER PUBLICATIONS

International Search Report and Written Opinion for PCT Patent Application No. PCT/US20/64654, dated Apr. 13, 2021, 11 pages.

(Continued)

*Primary Examiner* — Christopher B Shin
(74) *Attorney, Agent, or Firm* — Compass IP Law PC

(57) ABSTRACT

Examples described herein relate to processor circuitry to issue a cache coherence message to a central processing unit (CPU) cluster by selection of a target cluster and issuance of the request to the target cluster, wherein the target cluster comprises the cluster or the target cluster is directly connected to the cluster. In some examples, the selected target cluster is associated with a minimum number of die boundary traversals. In some examples, the processor circuitry is to read an address range for the cluster to identify the target cluster using a single range check over memory regions including local and remote clusters. In some examples, issuance of the cache coherence message to a cluster is to cause the cache coherence message to traverse one or more die interconnections to reach the target cluster.

18 Claims, 7 Drawing Sheets

(56) References Cited

U.S. PATENT DOCUMENTS

| | | |
|---|---|---|
| 2014/0032853 A1 | 1/2014 | Lih et al. |
| 2015/0106569 A1 | 4/2015 | Cordero et al. |
| 2016/0147661 A1* | 5/2016 | Ambroladze ....... G06F 12/0817 |
| | | 711/130 |
| 2017/0228317 A1* | 8/2017 | Drapala .............. G06F 12/0824 |
| 2017/0308483 A1* | 10/2017 | Ishii ................... G06F 12/0806 |
| 2018/0101502 A1 | 4/2018 | Nassif et al. |
| 2018/0189180 A1* | 7/2018 | Fahim ................. G06F 12/0833 |
| 2019/0004921 A1 | 1/2019 | Fahim et al. |
| 2019/0042432 A1 | 2/2019 | Khade et al. |
| 2019/0171578 A1 | 6/2019 | Patel et al. |
| 2019/0236038 A1* | 8/2019 | Choudhary ............. G06F 13/20 |
| 2020/0211966 A1* | 7/2020 | Raorane .................. H01L 24/16 |
| 2020/0264797 A1* | 8/2020 | Kohl ................... G06F 12/0817 |
| 2020/0301831 A1* | 9/2020 | Wilson ................ G06F 12/0831 |
| 2021/0098375 A1* | 4/2021 | Foo .................. H01L 21/76877 |
| 2022/0004439 A1* | 1/2022 | Abraham ............ G06F 13/4221 |

OTHER PUBLICATIONS

"MESI Protocol", Wikipedia, https://en.wikipedia.org/wiki/MESI_protocol, downloaded from the internet Jan. 2, 2019, 7 pages.

Alcorn, Paul, "Intel Introduces New Mesh Architecture For Xeon And Skylake-X Processors", tom's HARDWARE, https://www.tomshardware.com/news/intel-mesh-architecture-skylake-x-hedt,34806.html, published Jun. 15, 2017, 7 pages.

Intel, "Enabling Next-Generation Platforms Using Intel's 3D System-in-Package Technology", FPGA, White Paper, Jun. 19, 2017, 7 pages.

Mulnix, David, "Intel Xeon Processor Scalable Family Technical Overview" published on Jul. 10, 2017, updated Sep. 14, 2017, 29 pages.

Numascale, "Snooping Based Cache Coherence", https://www.numascale.com/snooping-based-cache-coherence/, Jan. 2, 2019, 2 pages.

\* cited by examiner

LINK AFFINITIZATION TO REDUCE TRANSFER LATENCY

Computing systems allow content of memory to be accessed by multiple processor elements at the same time. For example, a processor can store a copy of content in a cache and another processor can store the same copy of the content in another cache. Cache devices can provide more rapid access to data by a processor than that provided using a memory device. Cache coherence aims to provide the most current version of the content in memory and cache, so that a most current version is accessed and processed. In a case where a device or process sends a query to other remote devices or remote processes as to their access or use of cached content, a time to receive a response to the query can introduce a delay that slows system performance.

DETAILED DESCRIPTION

Figure 1:
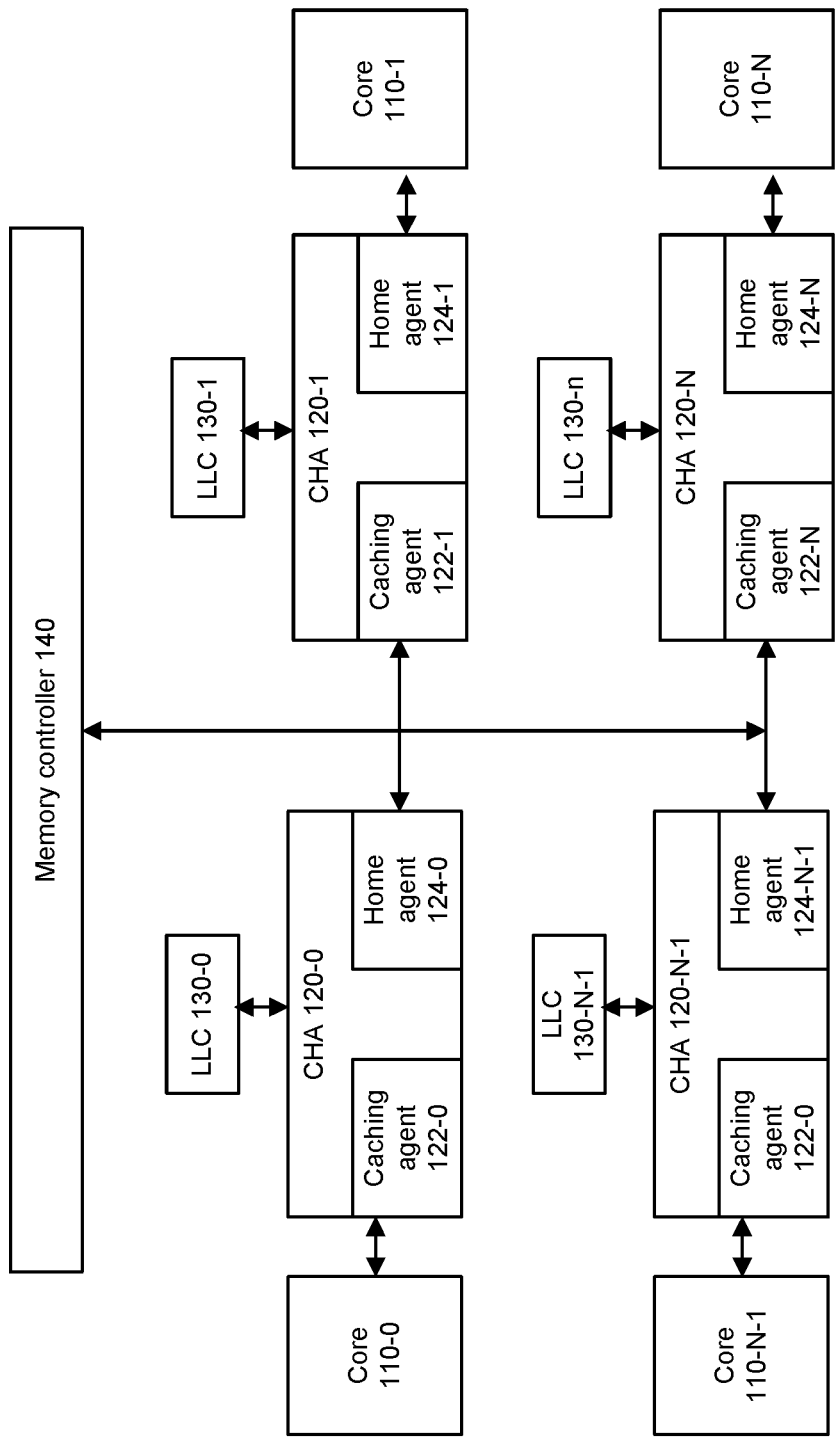
FIG. 1 depicts an example system.

FIG. 1 depicts an example system. Processor 100 includes a plurality of cores 110-0 to 110-N. A core can be an execution core or computational engine that is capable of executing instructions. A core can access its own cache and read only memory (ROM), or multiple cores can share a cache or ROM. Cores can be homogeneous (e.g., same processing capabilities) and/or heterogeneous devices (e.g., different processing capabilities). Frequency or power use of a core can be adjustable. Any type of inter-processor communication techniques can be used, such as but not limited to messaging, inter-processor interrupts (IPI), inter-processor communications, and so forth. Cores can be connected in any type of manner, such as but not limited to, bus, ring, or mesh.

In a given multicore processor implementation, a core 110 may access a cache that includes one or more levels of a cache hierarchy. For example, in some embodiments, a core 110 may include private cache memories, including level 1 (L1), level 1 (L2), and level 3 (L3) cache memories. In some embodiments, such cache memories may be maintained non-inclusively so that information present in one or more of these cache memories may not be present in higher levels of a cache hierarchy, such as a shared cache to which cores may couple.

Cores may be coupled via an interconnect to a system agent (uncore). A system agent can include a shared cache which may include any type of cache (e.g., level 1, level 2, or last level cache (LLC)). A system agent can include or more of: a memory controller, a cache coherency manager, arithmetic logic units, floating point units, core or processor interconnects, or bus or link controllers. A system agent or uncore can provide one or more of: direct memory access (DMA) engine connection, non-cached coherent master connection, data cache coherency between cores and arbitrates cache requests, or Advanced Microcontroller Bus Architecture (AMBA) capabilities. A system agent or uncore can manage priorities and clock speeds for receive and transmit fabrics and memory controllers.

A core can be coupled to a combined caching agent and home agent, referred to herein as a caching home agent (CHA) 120 or caching agent (CA) 122 and home agent (HA) 124. In general, CHA 120 can serve as a local coherence and cache controller (via cache controller 122, also referred to herein as a caching agent), and also serve (via home agent 124) as a global coherence and memory controller interface. In some embodiments, CHA 120 may be of a distributed design, including one or more of the distributed CHAs 120-0 to 120-N associated with one of the cores. A CHA 120 can include a caching agent 122 and a home agent 124.

In some embodiments, one or more CHA 120 couples to a distributed portion of LLC 130-0 to 130-N. More particularly, one or more individual caching agent 122 may interact with a corresponding LLC portion or slice 130. CHA 120 can attempt to maintain cache coherency among different memory and cache devices in other clusters or sockets.

A core can send requests to its CA 122. CA 122 can provide data from its cache slice or obtain a copy of data from another core's cache. In case of a cache miss, CA 122 can forward the request to a home agent 124 which provides the data from memory or sends snoop requests to other caching agents 122 and to a home agent 124. If another caching agent 122 maintains a copy of the cache line in state modified, exclusive, or forward, a copy of the cache line can be provided to the requester.

Caching agent 122 can include a cache controller that includes a cache pipeline and/or other circuitry that is associated with a corresponding portion of a cache memory, such as a distributed portion of a last level cache (LLC). Caching agent 122 and home agent 124 can work together to achieve data consistency by exchanging messages over a connection. Caching agent 122 may initiate transactions into coherent memory and may retain copies in a cache. Caching agent 122 can receive or transmit messages according to a cache coherence protocol. Any type of cache coherence protocol can be used such as but not limited to MESIF (Modified Exclusive Shared Invalid Forward), MOESI (Modified Owned Exclusive Shared Invalid), and so forth.

Caching agent 122 can provide copies of the coherent memory contents to other caching agents. Home agent 124 can service coherent transactions, including handshaking with caching agents. Home agent 124 can supervise an address space of coherent memory. Home agent 124 can manage the conflicts that might arise among different caching agents 122. Home agent 124 can provide the data and ownership responses.

Figure 2:
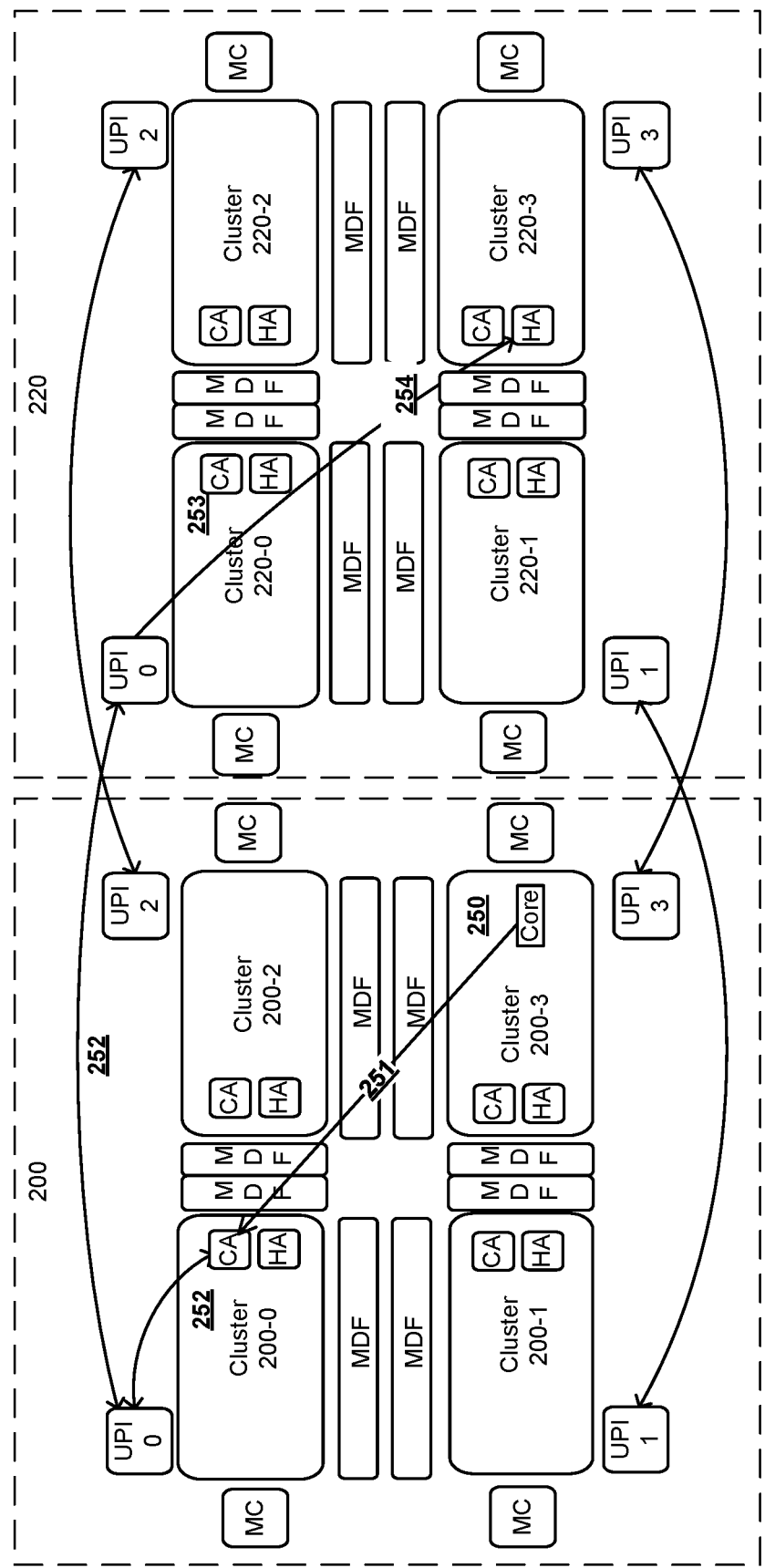
FIG. 2 depicts an example system and flow.

FIG. 2 depicts an example system and flow. Socket 200 can include clusters 200-0 to 200-3. Similarly, socket 220 can include clusters 220-0 to 220-3. A socket can include a connector to a motherboard or circuit board that includes a central processing unit (CPU) and provides an electrical interface with the CPU. Any cluster can include a CA, HA, CHA, one or more processors or cores, and one or more caches (e.g., L1, L2, L3, LLC). In some examples, reference to CA or HA can instead refer to CHA or any reference to CHA can refer to CA or HA. In some examples, a cluster can be associated with a memory controller (MC) that copies data from cache to memory or vice versa. Within socket 200 or 220, a cluster can be communicatively coupled to another cluster within the same socket using any multiple die-to-die connectivity technology (e.g., MDF).

For example, a silicon interposer and Through Silicon Vias (TSVs) can be used to connect dies at silicon interconnect speed. In some cases, embedded bridges in a single substrate can be used to provide high input/output (I/O) rates and electrical interconnect paths between multiple die. A silicon bridge embedded under the edges of two interconnecting die can be used to conductively couple die in multiple dimensions. Micro-bumps can be used to support for high density signals, and flip chip bumps can be used for direct power and ground connections from chip to package. In some examples, Intel Embedded Multi-die Interconnect Bridge (EMIB) can be used for die-to-die connectivity. A Modular Die Fabric (MDF) can be used to interconnect two different clusters.

At 250, a core or CA of cluster 200-3 can request a cache coherence operation. A cache coherence operation can include issuance of a cache coherence request or message (e.g., coherence read or ownership request) to one or more cache devices to determine if any other cache device stores or uses content associated with a particular address range in accordance with any cache coherence protocol. In this example, the core or its CA in cluster 200-3 can issue a coherence message whereby a destination of the coherence message is determined using a random hash to be cluster 200-0. The coherence message is sent to cluster 200-0. At 251, the message can be transferred from cluster 200-3 via cluster 200-2 to cluster 200-0 or via cluster 200-1 to cluster 200-0 of socket 200. At 252, caching agent (CA) decoder in cluster 200-0 of socket 200 has a full view of the system address map and determines the cache coherence request can be satisfied by cluster 220-3 of socket 220. The CA of cluster 200-0 picks the cross socket link number 0 (UPI0) which is in close proximity to cluster 200-0 of socket 200 to transfer the cache coherence message to cluster 220-0 of socket 220. For example, the cross socket link can be any type of processor-to-processor interconnect with shared address space such as Intel® Ultra Path Interconnect (UPI), or any other connection technology such as those described herein.

At 253, upon arrival of the cache coherence message on cluster 220-0 of remote socket 220, a home agent (HA) is identified by CA of cluster 220-0 to be in cluster 220-3. For example, the HA can be identified by the address decoders in a UPI connection interface. At 254, the cache coherence message is transferred from cluster 220-0 to cluster 220-3 via cluster 220-2 or via cluster 220-1. The transaction in this case takes four MDF crossings (e.g., cluster 200-3 to cluster 200-2, cluster 200-2 to cluster 200-0, cluster 220-0 to cluster 200-2, and cluster 200-2 to cluster 200-3). An MDF crossing can introduce latency, so limiting the number of MDF crossings can reduce latency to determine cache coherence, which can impact when processing can commence using data from a cache.

Note that in 250, in some examples, the hash in cluster 200-3 of socket 200 can select cluster 200-2 of socket 200 and traverse UPI2 to cluster 220-2 of socket 220, which could lead to two MDF crossings, which is an improvement over the four MDF crossings in the scenario described. However, a deterministic manner of selecting a cluster in socket 200 can be desired to reduce a number of MDF crossings.

In some cases, identifying a caching agent (CA) in a local socket to use to transfer a request to another socket to reduce latency (e.g., number of MDF crossings in the local and remote socket) can be challenging. Various embodiments provide for utilizing a cache agent in a local socket which has the closest proximity in terms of connectivity (e.g., reduced or minimized MDF crossings and closest cross socket link in terms of physical distance or signal conductivity path) with respect to a home agent in a remote socket that is a receiver of the remote access. Accordingly, a cache agent in a local socket that shares a cross socket link with the target home agent in the remote socket can receive a transaction from a CPU cluster in the local socket and the transaction may traverse zero or more cluster boundaries to arrive at the cache agent. However, at the remote socket, the target home agent will receive and process the transaction and no further cluster boundaries are traversed.

For cross socket transactions (e.g., cache coherence message), the latencies are increasing generation over generation for server products due to increased MDF crossings. Various embodiments may reduce transaction latency with another socket by configuring a memory map in a way so that cross socket transactions use minimal die-to-die connection crossings and a cluster that shares a cross socket link with the target cluster. Some embodiments provide for use of a single contiguous address range look-up for local and remote sockets per socket number so that a single look-up can take place to determine a cluster that is responsible for managing coherence of a cache line instead of using multiple look-up operations. The system address map can be organized so that memories belonging to the connected clusters across sockets are grouped together, enabling remote accesses to be provided to a caching agent which has the closest proximity with respect to the home agent in the remote socket (e.g., via a direct connection). Various embodiments can affinitize fabric agents which communicate directly using a closest cross socket link (e.g., direct link connection) in a system address map.

In some examples, firmware (e.g., Basic Input/Output System (BIOS), Universal Extensible Firmware Interface (UEFI), or a boot loader) can configure a core's system address map so that the core can provide a request to a cache agent in a local socket that is directly connected with a target home agent (e.g., using a UPI link).

Figure 3:
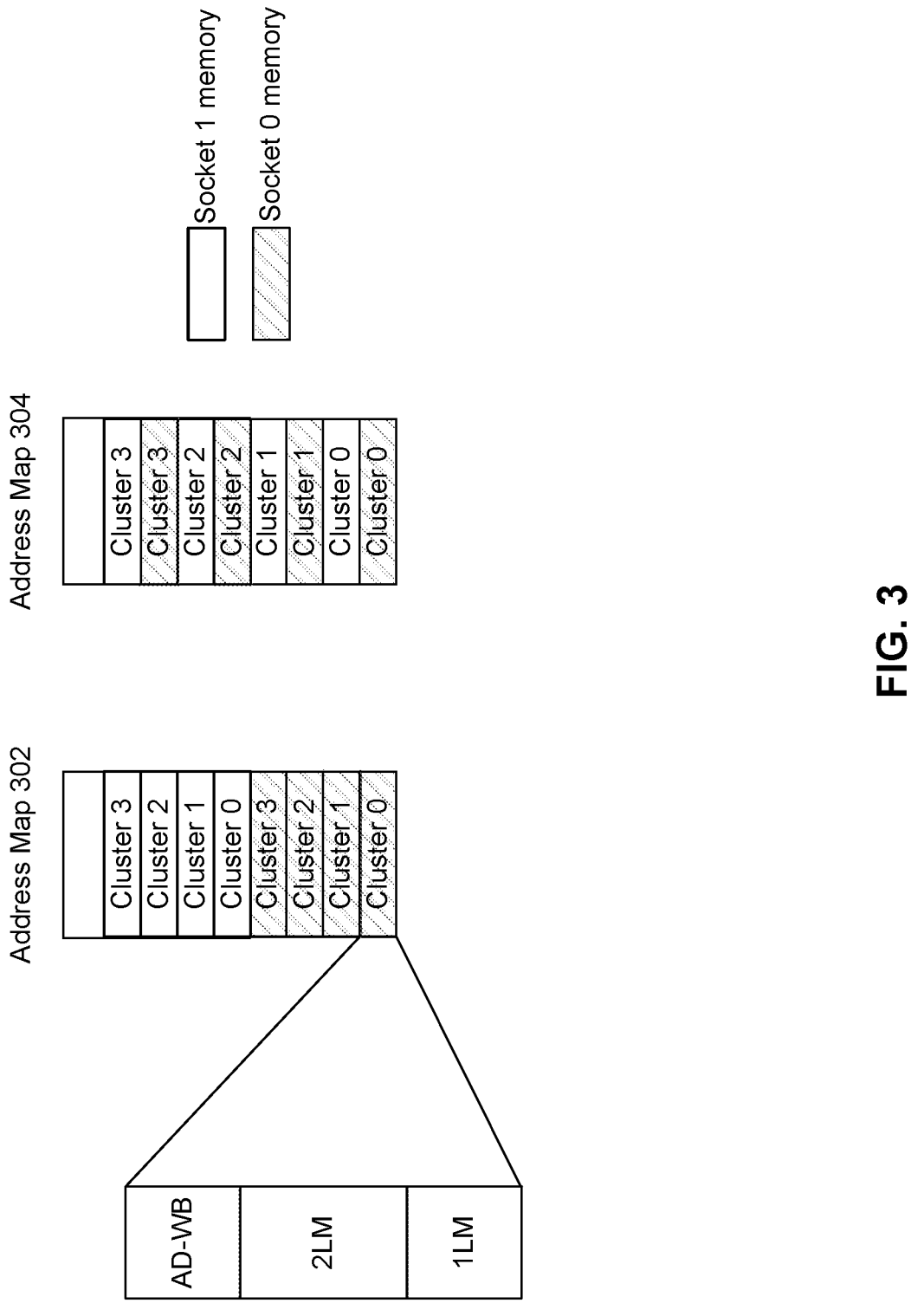
FIG. 3 depicts an example system memory address range organization.

FIG. 3 shows an example of address map populations with and without use of address affinization. To determine cache coherence, a core or CA can check its L3 cache on its die before transacting with memory. A core or CA can issue a coherent read or ownership request that is proxied through a cluster for transfer to another cluster. A core or CA can use an address map to determine which cluster to communicate with to determine cache coherence. An address map can include address ranges for one or more clusters in a local socket and remote socket(s). For example, address map 302 can provide address ranges associated with clusters 3 to 0 of socket 1 (e.g., a remote socket) followed by address ranges associated with clusters 3 to 0 of socket 0 (e.g., a local socket). Address map 304 can provide address ranges associated with cluster 3 of socket 1 followed by address ranges associated with cluster 3 of socket 0; address ranges associated with cluster 2 of socket 1 followed by address ranges associated with cluster 2 of socket 0; and so forth. For example, AD-WB can be a first address range of physical memory; 2LM can be a second address range of physical memory; and 1LM can be an address range of physical memory.

For address map 302, to determine which cluster is to determine cache coherence for an address associated with a cache line, a core or CA is to perform a search of an address range of cluster 3 of a remote socket memory followed by a search of an address range of cluster 2 of a remote socket memory and so forth. However, using map 302, to determine if an address range corresponds to cluster 3 of a remote or local socket, the core or CA issues multiple range check operations for cluster 3 of a remote socket and cluster 3 of a local socket. For more sockets, the number of range check operations or amount of circuitry to perform the multiple range check operations increases. Using map 304, to determine if an address range corresponds to cluster 3 of any number of remote and local sockets, the core or CA issues a single range check operation for cluster 3 over a contiguous address range. Based on the range hit, the core or CA can transact with a cluster associated with the range hit to request a cache coherence operation.

For example, using map 302, a core or CA may need to perform up to 8 range checks whereas using address affinitization of map 304 can involve up to 4 range checks. In some examples, twice as much logic or circuitry can be needed for a core or CA to determine a range check where map 302 is used as compared to use of map 304. Reducing a number of range checks can potentially reduce a time taken for a destination to receive a cache coherence request and to complete a cache coherence response. A CA of a local cluster can perform an address decode to determine if a memory range is local or remote and if the memory range is remote, the cluster can transfer the request using its UPI link to a corresponding remote cluster in another socket.

Figure 4:
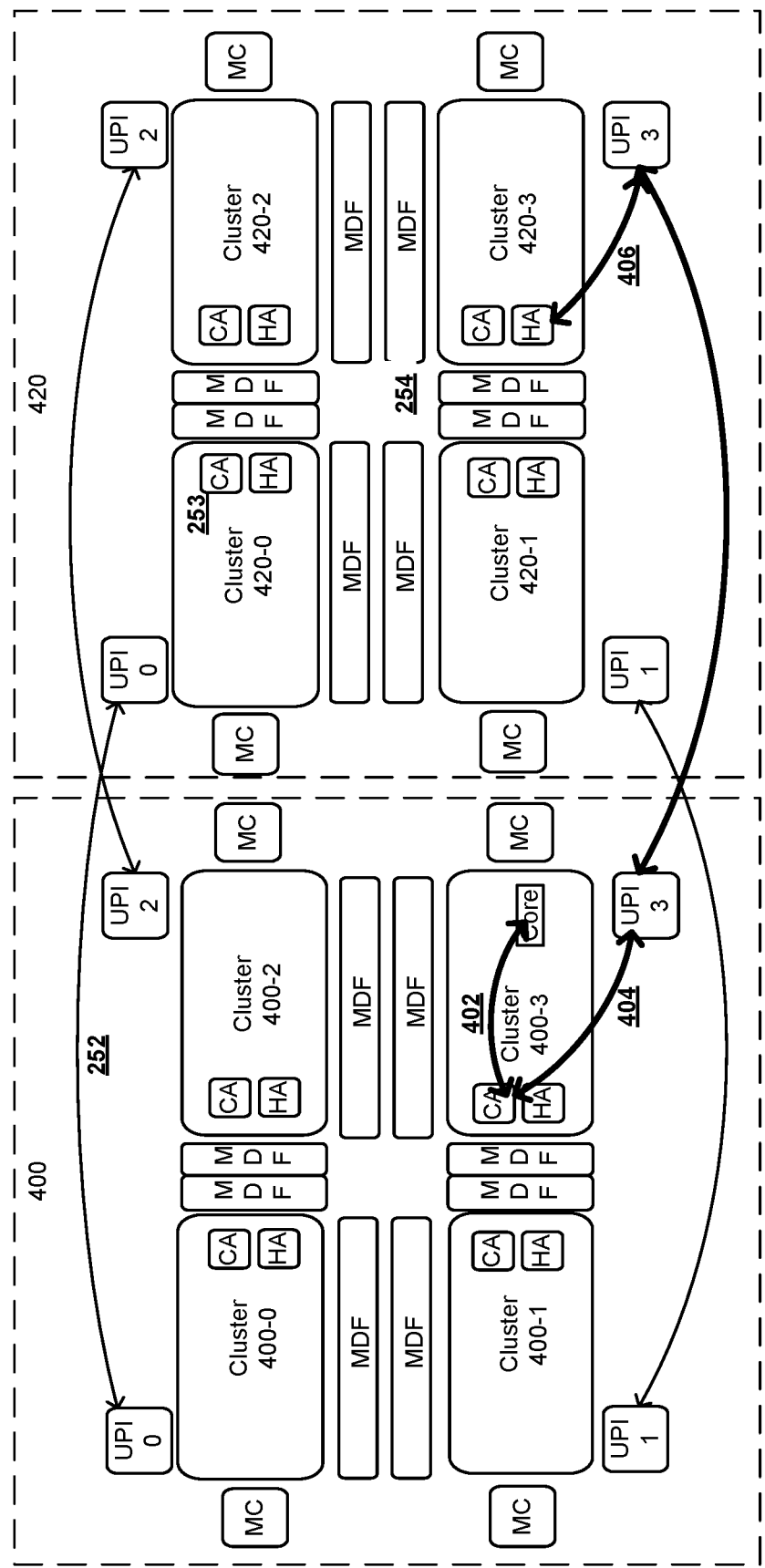
FIG. 4 depicts an example system and flow.

FIG. 4 depicts an example system and flow. At 402, a core or CA on cluster 400-3 in socket 400 can originate a cache coherence message (e.g., coherence read, ownership request transaction, or snoop request). With a memory map organization in accordance with various embodiments, a remote access from core of cluster 400-3 is determined to use a caching agent which is in proximity (with respect to the cross socket link connection) with a die cluster in remote socket 420 to which that specific address location maps-to. In this example, core is in die cluster 400-3 and a coherence message is determined to be routed using caching agent in cluster 400-3 to cluster 420-3 in socket 420.

At 404, a caching agent (CA) decoder can access a system address map that identifies cache coherence of addressable memory locations managed by sockets 400 and 420 and CA decoder can select cross socket link 3 (UPI 3) to transfer the coherence message. Upon arrival at cluster 420-3 of socket 420, at 406, home agent determines the transaction destination to be in cluster 420-3. In this example, MDF crossings on socket 420 is 0 and MDF-related latency is zero. A worst-case number of MDF crossings is limited to 2 in the local socket, socket 400.

In this example, as a destination memory (not shown) is attached to cluster 420-3, and any requests from cores in clusters 400-0, 400-1, or 400-2 can be routed to a cluster 400-3 caching agent as a proxy to cluster 420-3. In other examples, for a cache coherence message originating at cluster 400-0, 400-1, or 400-2, there are at most 2 MDF crossings (e.g., cluster 400-0 to cluster 400-1 or cluster 400-2, and cluster 400-1 or cluster 400-2 to cluster 400-3). Thereafter, a response to the coherence read or ownership request transaction can be provided (e.g., no match, match with data, data shared, data exclusive owned, and so forth). A response can take a path with fewest MDF crossings or a same path as a request, or other paths.

In some examples, where a destination HA is not in cluster 420-3, CA decoder of cluster 400-3 can issue a transaction to cluster 420-3 via UPI3 and allow address decoders in a UPI connection interface to identify a destination HA and whether to transfer the transaction to another cluster. For example, if the target cluster were cluster 420-0, UPI connection interface of cluster 420-3 can transfer the transaction to cluster 420-1 or cluster 420-2, and from cluster 420-1 or cluster 420-2 to cluster 420-0.

Various embodiments can apply to more than two sockets. A cluster can include a link (e.g., UPI) for each cluster-to-cluster connection. For example, where cluster 400-0 is to communicate with four other clusters, four different UPI links can be used between cluster 400-0 and each of the four other clusters.

Figure 5:
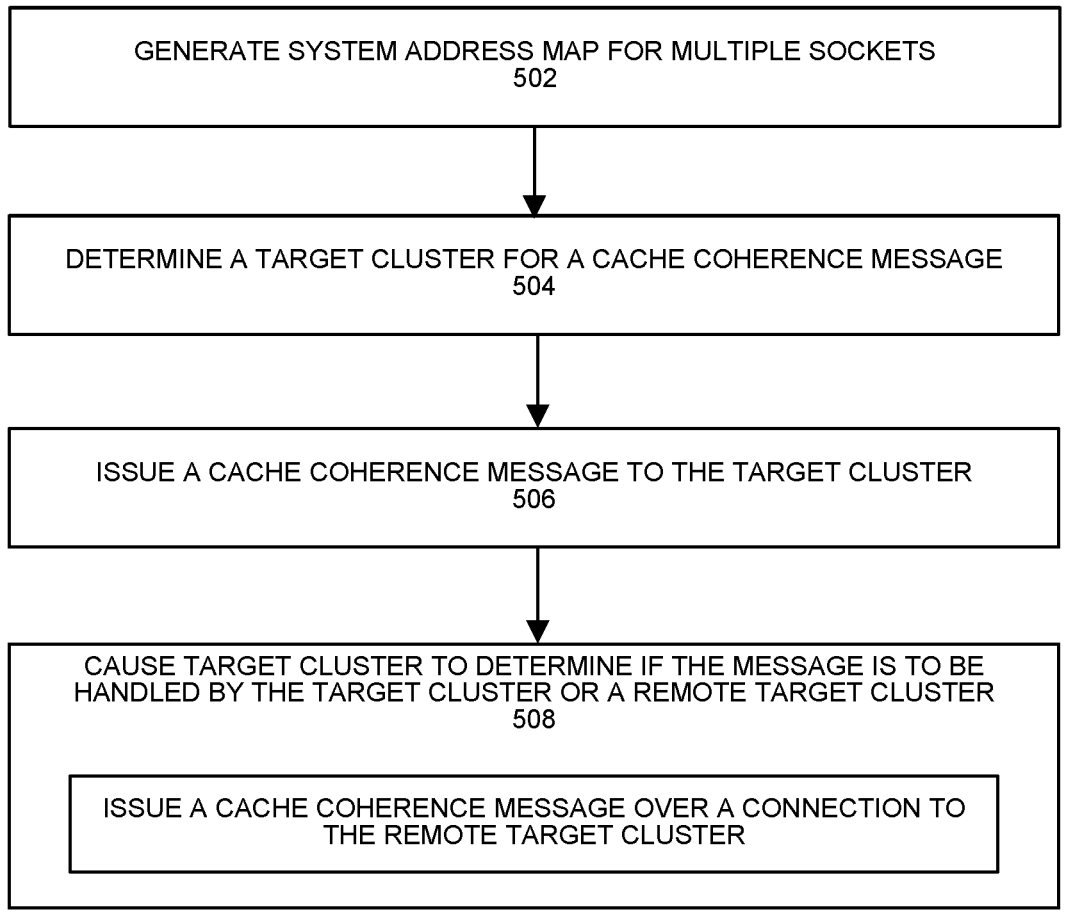
FIG. 5 depicts an example process.

FIG. 5 depicts a process. The process can be used by a core to determine a cluster to which to send a cache coherence message (e.g., coherence read or ownership request or HA-generated snoop request). At 502, a system address map is generated that provides for continuous address ranges for different clusters of different sockets. The address ranges can be set so that a cache coherence message that is to be transferred to a cluster in another socket is provided to a local cluster that is responsible for responding to the cache coherence message and the local cluster is directly connected to the remote cluster. For example, a system address map can be generated for use by a core, or associated CA or HA. At 504, the core or CA can access the system address to determine a target cluster for a cache coherence message. For example, the core can determine to generate a cache coherence message prior to accessing or processing content in a cache. At 506, the core can issue the cache coherence message to the determined target cluster. With a memory map organization in accordance with various embodiments, the determined target cluster is deterministically or consistently selected so that if the determined target cluster is to transfer a cache coherence message to a target cluster on another socket, merely one cross link transfer and no other cross-die transfers takes place on the another socket. At 508, the target cluster can determine if the cache coherence message is to be handled by the target cluster or another cluster. For example, a cache and home agent (CHA) can determine if an address associated with the cache coherence message is to be handled by the target cluster or another cluster (e.g., remote cluster in another socket connected via a direct link). If the cache coherence message is to be handled by another cluster, the target cluster can transfer the cache coherence message over a direct link (e.g., UPI) to the another cluster (e.g., remote target cluster). A response can be provided by the target cluster (e.g., local or remote) to the core that issued the cache coherence message to reduce a number of die-to-die traversals in a similar manner as that used to send the cache coherence message to the HA in a local or remote cluster.

Figure 6:
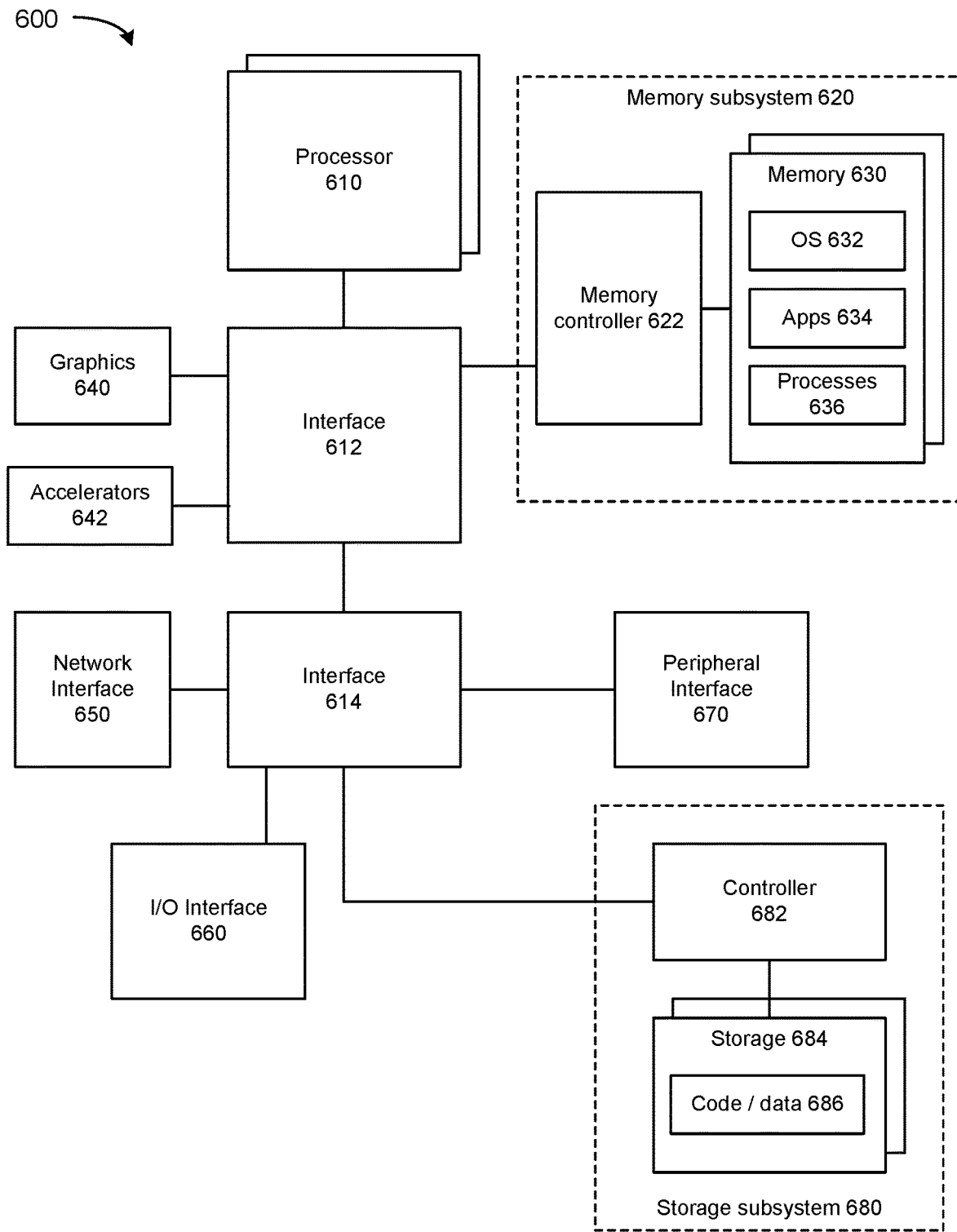
FIG. 6 depicts a system.

FIG. 6 depicts a system. The system can use embodiments described herein to transfer cache coherence message and responses. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs).

Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Figure 7:
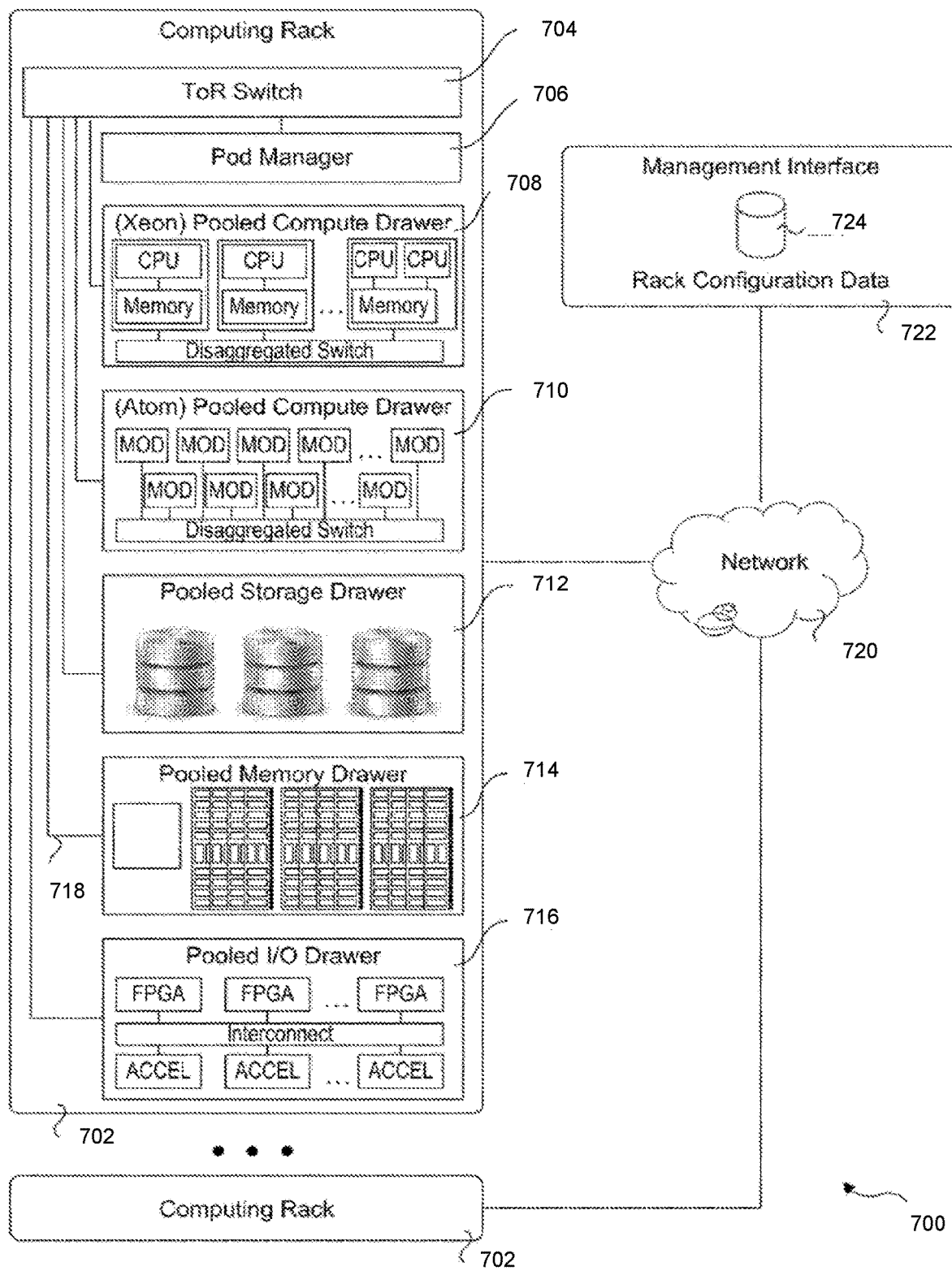
FIG. 7 depicts an environment.

FIG. 7 depicts an environment 700 includes multiple computing racks 702, each including a Top of Rack (ToR) switch 704, a pod manager 706, and a plurality of pooled system drawers. The environment can use embodiments described herein to transfer cache coherence message and responses. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 708, and Intel® ATOM™ pooled compute drawer 710, a pooled storage drawer 712, a pooled memory drawer 714, and a pooled I/O drawer 716. Each of the pooled system drawers is connected to ToR switch 704 via a high-speed link 718, such as a 40 Gigabit/second (Gb/s) or 100 Gb/s Ethernet link or a 100+Gb/s Silicon Photonics (SiPh) optical link. In one embodiment high-speed link 718 comprises an 800 Gb/s SiPh optical link.

Multiple of the computing racks 702 may be interconnected via their ToR switches 704 (e.g., to a pod-level switch or data center switch), as illustrated by connections to a network 720. In some embodiments, groups of computing racks 702 are managed as separate pods via pod manager(s) 706. In one embodiment, a single pod manager is used to manage all of the racks in the pod. Alternatively, distributed pod managers may be used for pod management operations.

Environment 700 further includes a management interface 722 that is used to manage various aspects of the environment. This includes managing rack configuration, with corresponding parameters stored as rack configuration data 724. Environment 700 can be used for computing racks.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a method comprising: issuing a cache coherence request to a cluster by selecting a target cluster from among two or more target clusters and issuing the cache coherence request to the selected target cluster, wherein the target cluster is consistently allocated to be either the cluster or the target cluster is directly connected to the cluster with a minimum number of die boundary traversals.

Example 2 includes any example, wherein the cluster comprises a die with one or more of: a core, caching agent, home agent, or caching and home agent.

Example 3 includes any example, and includes: reading a memory address range for the cluster to identify the target cluster using a single range check over memory regions associated with local and remote clusters.

Example 4 includes any example, wherein the cache coherence request is issued from a source cluster and wherein the source cluster is part of a multiple central processing unit (CPU) system with multiple clusters.

Example 5 includes any example, wherein a die boundary traversal comprises traversal of a die-to-die interconnection.

Example 6 includes any example, wherein the die-to-die interconnection is compatible with Embedded Multi-die Interconnect Bridge (EMIB).

Example 7 includes any example, wherein a caching agent of the target cluster performs an address decode to determine if a memory address corresponds to local cluster or remote cluster.

Example 8 includes any example, and includes: based on the memory address corresponding to a remote cluster, the target cluster transfers the cache coherence request to a remote target cluster via a socket-to-socket connection, wherein the remote target cluster comprises the cluster.

Example 9 includes any example, and includes: receiving a response to the cache coherence request, the response comprising one or more of: no match, match with data, data shared, or data exclusive owned.

Example 10 includes any example, and includes: an apparatus, comprising: processor circuitry to issue a cache coherence message to a central processing unit (CPU) cluster by selection of a target cluster among two or more target clusters and issuance of the request to the target cluster, wherein the target cluster comprises the CPU cluster or the target cluster is directly connected to the CPU cluster.

Example 11 includes any example, wherein the selected target cluster is associated with a minimum number of die boundary traversals.

Example 12 includes any example, wherein the processor circuitry is to read an address range for the cluster to identify the target cluster using a single range check over memory regions associated with local and remote clusters.

Example 13 includes any example, wherein the processor circuitry comprises a core of a source cluster and wherein the source cluster is part of a multiple central processing unit (CPU) system with multiple clusters.

Example 14 includes any example, wherein a die boundary traversal comprises traversal of a die-to-die interconnection.

Example 15 includes any example, wherein the die-to-die interconnection is compatible with Embedded Multi-die Interconnect Bridge (EMIB).

Example 16 includes any example, wherein the cache coherence message is to cause a caching agent of the target cluster to perform an address decode to determine if a memory address range corresponds to a local cluster or remote cluster.

Example 17 includes any example, wherein: based on an memory address range corresponding to a remote cluster, the target cluster is to transfer the request to a remote target cluster, wherein the remote target cluster comprises the CPU cluster.

Example 18 includes any example, wherein the cache coherence message is to cause the remote target cluster to process the cache coherence message using a home agent.

Example 19 includes any example, wherein the processor circuitry is to receive a response to the cache coherence message, the response comprising one or more of: no match, match with data, data shared, or data exclusive owned.

Example 20 includes any example, and includes one or more of: a memory device, a memory controller, or a network interface.

What is claimed is:

1. A method comprising:
a processor, in a source cluster, selecting a target cluster from among two or more target clusters and issuing a cache coherence request to the selected target cluster via a first path, wherein
the selecting the target cluster is based on a memory map data that specifies which target cluster is physically closest to a die-to-die interconnect interface that is physically closest to the source cluster,
the selecting the target cluster from among the two or more target clusters minimizes a number of die boundary traversals and
the first path includes a first die-to-die interconnect interface for the source cluster and a second die-to-die interconnect interface to the selected target cluster and
the processor receiving a response to the cache coherence request and accessing a cache based on response, wherein the response comprises one or more of: no match, match with data, data shared, data exclusive owned and wherein the response traverses the first path but in an opposite direction to the source cluster from the selected target cluster.

2. The method of claim 1, wherein the source cluster comprises a die with one or more of: a core, caching agent, home agent, or caching and home agent and the target cluster comprises a die with one or more of: a core, caching agent, home agent, or caching and home agent.

3. The method of claim 1, comprising:
the processor identifying the target cluster based on a memory address range for the cache coherence request and a single range check over memory regions associated with multiple clusters.

4. The method of claim 1, wherein the source cluster and the two or more target clusters are part of a multiple central processing unit (CPU) system with multiple clusters.

5. The method of claim 1, wherein a die boundary traversal comprises traversal of a die-to-die interconnection.

6. The method of claim 5, wherein the die-to-die interconnection is compatible with Embedded Multi-die Interconnect Bridge (EMIB).

7. The method of claim 1, comprising:
a caching agent of the target cluster performing an address decode to determine if a memory address of the cache coherence request corresponds to another cluster.

8. The method of claim 7, comprising:
based on the memory address corresponding to another cluster, the target cluster transferring the cache coherence request to the target cluster or another cluster.

9. An apparatus, comprising:
processor circuitry, in a source cluster, to issue a cache coherence message to a target central processing unit (CPU) cluster by selection of a target cluster among two or more target clusters and issuance of the cache coherence message to the target cluster via a first path, wherein
the processor circuitry is to select the target CPU cluster based on a memory map data that specifies which target CPU cluster is physically closest to a die-to-die interconnect interface that is physically closest to the source cluster,
the processor circuitry is to select the target cluster from among the two or more target clusters by minimizing a number of die boundary traversals, and
the first path is to traverse a first die-to-die interconnect interface for the source cluster and a second die-to-die interconnect interface to the selected target cluster and
the processor circuitry is to receive a response to the cache coherence message and access a cache based on response, wherein the response comprises one or more of: no match, match with data, data shared, data exclusive owned and wherein the response traverses the first path but in an opposite direction to the source cluster from the selected target cluster.

10. The apparatus of claim 9, wherein the processor circuitry is to select the target cluster based on a memory address range for the cache coherence message and by use of a single range check over memory regions associated with multiple clusters.

11. The apparatus of claim 9, wherein the source cluster and the two or more target clusters are part of a multiple central processing unit (CPU) system with multiple clusters.

12. The apparatus of claim 9, wherein a die boundary traversal comprises traversal of a die-to-die interconnection.

13. The apparatus of claim 12, wherein the die-to-die interconnection is compatible with Embedded Multi-die Interconnect Bridge (EMIB).

14. The apparatus of claim 12, wherein the cache coherence message is to cause a caching agent of the target cluster to perform an address decode to determine if a memory address range corresponds to the target cluster or another cluster.

15. The apparatus of claim 14, wherein:
based on an memory address range corresponding to another cluster, the target cluster is to transfer the cache coherence message to the another cluster.

16. The apparatus of claim 15, wherein the cache coherence message is to cause the another cluster to process the cache coherence message using a home agent.

17. The apparatus of claim 9, comprising one or more of: a memory device, a memory controller, or a network interface, wherein the memory device, the memory controller, or the network interface are coupled to the processor circuitry.

18. The method of claim 1, wherein the cache coherence request comprises a request to determine if a cache device stores data associated with a particular address range.

* * * * *